(12) United States Patent
Yu et al.

(10) Patent No.: US 10,057,092 B1
(45) Date of Patent: Aug. 21, 2018

(54) TRANSMITTER FOR TRANSMITTING PACKETS AND METHOD THEREOF

(71) Applicant: Beken Corporation, Shanghai (CN)

(72) Inventors: Caogang Yu, Shanghai (CN); Dawei Guo, Shanghai (CN)

(73) Assignee: BEKEN CORPORATION, Shanghai (CN)

( * ) Notice: Subject to any disclaimer, the term of this patent is extended or adjusted under 35 U.S.C. 154(b) by 0 days.

(21) Appl. No.: 15/808,908

(22) Filed: Nov. 10, 2017

(30) Foreign Application Priority Data

Oct. 27, 2017 (CN) .......................... 2017 1 1023116

(51) Int. Cl.
*H04L 27/00* (2006.01)
*H04B 1/04* (2006.01)

(52) U.S. Cl.
CPC .......... *H04L 27/0008* (2013.01); *H04B 1/04* (2013.01); *H04B 2001/0408* (2013.01)

(58) Field of Classification Search
CPC .................. H04L 27/0008; H04B 1/04; H04B 2001/0408
See application file for complete search history.

(56) References Cited

U.S. PATENT DOCUMENTS

2014/0064402 A1\* 3/2014 Kim ........................ H04L 27/38
375/273

\* cited by examiner

*Primary Examiner* — Jaison Joseph
(74) *Attorney, Agent, or Firm* — Perkins Coie LLP

(57) ABSTRACT

A switching unit comprises a COordinate Rotation DIgital Computer (CORDIC) unit configured to estimate a maximum phase difference between a phase of the GFSK modulated signal to be switched and a phase of the QPSK modulated signal after switch; a timing unit communicatively coupled to the CORDIC unit and configured to generate adaptive steps according to a switch time and the estimated maximum phase difference, wherein the CORDIC is further configured to generated an adjusted GFSK modulated signal by adjusting a phase of the GFSK modulated signal to be switched according to the estimated maximum phase difference and the adaptive steps.

8 Claims, 7 Drawing Sheets

TRANSMITTER FOR TRANSMITTING PACKETS AND METHOD THEREOF

CROSS REFERENCE OF RELATED APPLICATIONS

This application claims priority to Chinese Application number 201711023116.7 entitled "transmitter for transmitting packets and method thereof," filed on Oct. 27, 2017 by Beken Corporation, which is incorporated herein by reference.

TECHNICAL FIELD

The present application relates to packet transmission technology and more particularly, but not exclusively, to a transmitter and a method for transmitting a Bluetooth packet.

BACKGROUND

The process of packet transmission often needs to switch from Gaussian frequency-shift keying (GFSK) mode to Quadrature Phase Shift Keying (QPSK) mode. Since a power amplifier (PA) is in high power mode during the moment of the switch, such switch will lead to spectrum leakage during transmission. Therefore it is desirable to reduce spectrum leakage.

SUMMARY

According to an embodiment of the invention, a transmitter for transmitting packets, wherein the transmitter is configured to switch from a Gaussian frequency-shift keying (GFSK) modulated signal to a Quadrature phase-shift keying (QPSK) modulated signal, the transmitter comprising a switching unit comprising a COordinate Rotation DIgital Computer (CORDIC) unit configured to estimate a maximum phase difference between a phase of the GFSK modulated signal to be switched and a phase of the QPSK modulated signal after switch; a timing unit communicatively coupled to the CORDIC unit and configured to generate adaptive steps according to a switch time and the estimated maximum phase difference, wherein the CORDIC unit is further configured to generate an adjusted GFSK modulated signal by adjusting a phase of the GFSK modulated signal to be switched according to the estimated maximum phase difference and the adaptive steps; a modulator communicatively coupled to the switching unit and configured to generate a RF QPSK signal by mixing modulating the RF local oscillation signal with the QPSK modulated signal; and a power amplifier communicatively coupled to the modulator and configure to generate amplified QPSK signal by amplifying the RF QPSK signal respectively.

According to another embodiment of the invention, a method for transmitting packets, wherein the transmitter is configured to switch from a Gaussian frequency-shift keying (GFSK) modulated signal to a Quadrature phase-shift keying (QPSK) modulated signal, the method comprising: estimating, by a COordinate Rotation DIgital Computer (CORDIC) unit, a maximum phase difference between a phase of the GFSK modulated signal to be switched and a phase of the QPSK modulated signal after switch; generating, by a timing unit communicatively coupled to the CORDIC unit, adaptive steps according to a switch time and the estimated maximum phase difference, generating, by the CORDIC unit, an adjusted GFSK modulated signal by adjusting a phase of the GFSK modulated signal to be switched according to the estimated maximum phase difference and the adaptive steps; generating, by a modulator communicatively coupled to the CORDIC unit, a RF QPSK signal by modulating a RF local oscillation signal with the QPSK modulated signal; and generating, by a power amplifier communicatively coupled to the modulator, amplified QPSK signal by amplifying the RF QPSK signal respectively.

According to embodiments of the invention, spectrum leakage does not occur in the baseband, and performance of the transmitter is improved.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Various aspects and examples of the invention will now be described. The following description provides specific details for a thorough understanding and enabling descriptive examples. Those skilled in the art will understand, however, that the invention may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the invention. Certain terms may even be emphasized below, however, any terminology intended to be interpreted in any restricted manner will be overtly and specifically defined as such in this Detailed Description section.

Figure 1:
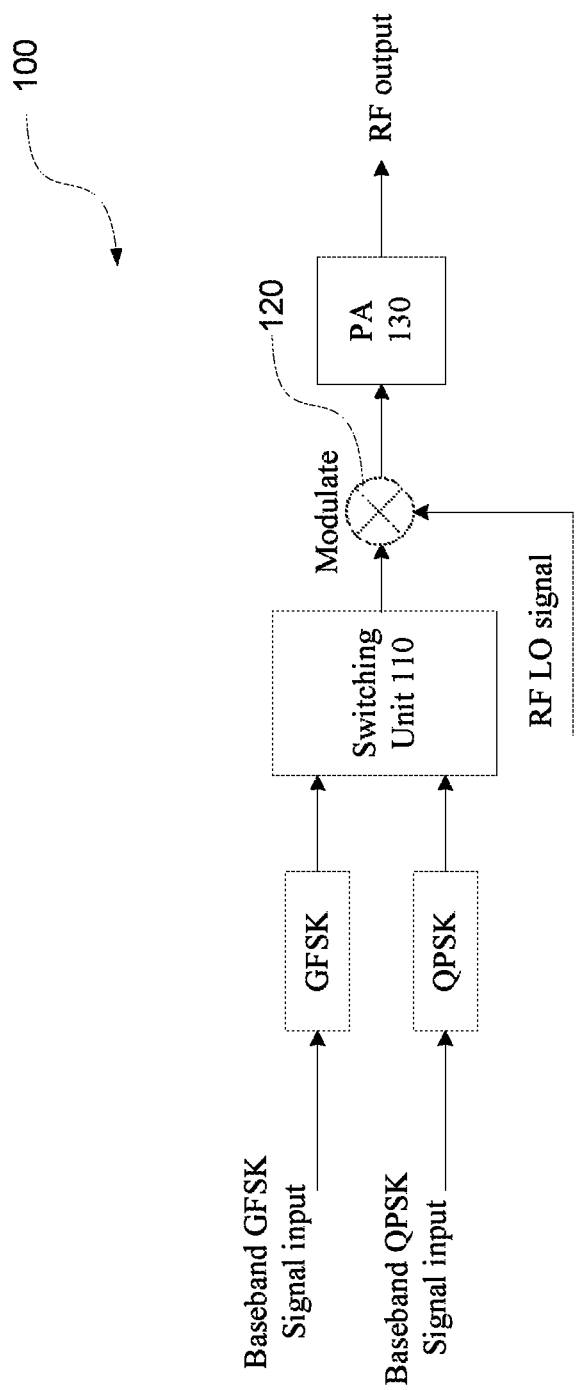
FIG. 1 is a circuit diagram illustrating a transmitter for transmitting packets according to an embodiment of the present invention.

FIG. 1 is a circuit diagram illustrating a transmitter 100 for transmitting packets according to an embodiment of the present invention.

The transmitter 100 comprises a switching unit 110 for switching from baseband Gaussian frequency-shift keying (GFSK) modulated signal to a baseband Quadrature phase-shift keying (QPSK) modulated signal, a modulator 120, and a power amplifier (PA) 130. The modulator 120 is configured to generate RF QPSK signal by mixing modulating the RF local oscillation signal with the baseband QPSK modulated signal. The PA 130 is connected to the modulator 120 is configured to amplify the RF QPSK signal.

Figure 2A:
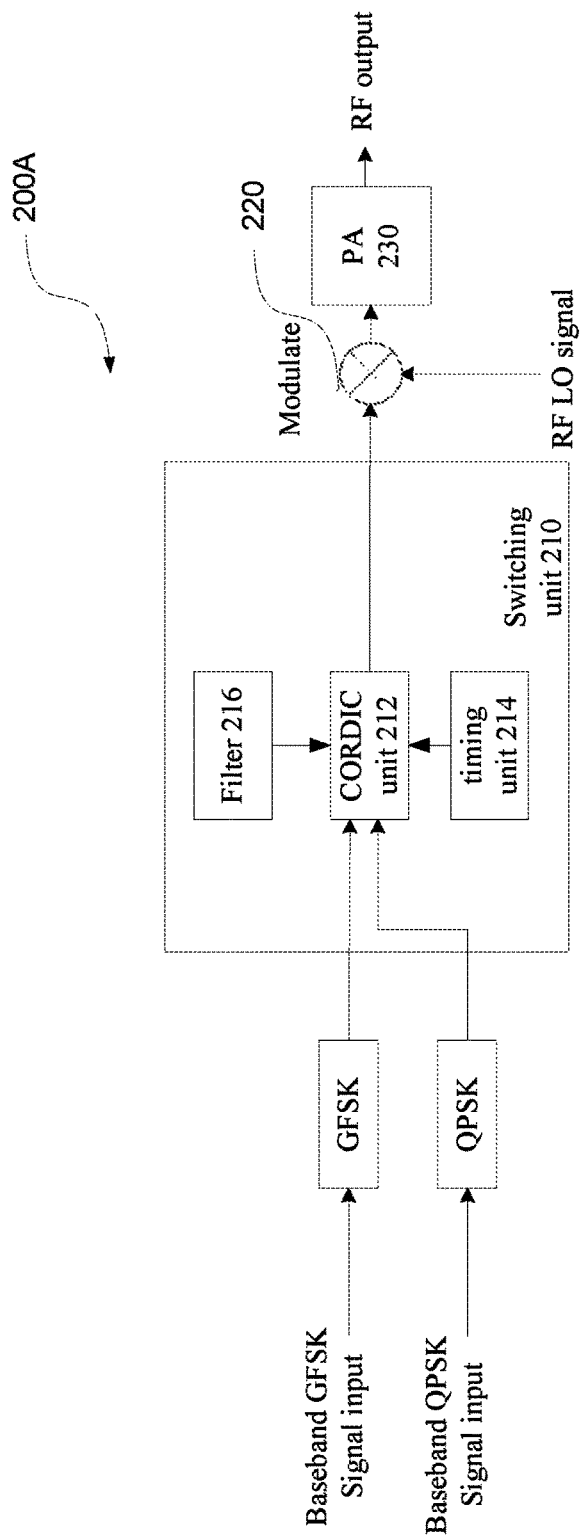
FIG. 2A is a circuit diagram illustrating a transmitter for transmitting packets according to another embodiment of the present invention.

FIG. 2A is a circuit diagram illustrating a transmitter 200A for transmitting packets according to another embodiment of the present invention.

The transmitter 200A is configured to switch from a Gaussian frequency-shift keying (GFSK) modulated signal to a Quadrature phase-shift keying (QPSK) modulated signal. The transmitter 200A comprises a switching unit 210, a modulator 220 and a power amplifier (PA) 230. The switching unit 210 comprises a COordinate Rotation DIgital Computer (CORDIC) unit 212 and a timing unit 214. The CORDIC unit 212 is configured to estimate a maximum phase difference between a phase of the GFSK modulated signal to be switched and a phase of the QPSK modulated signal after switch. To be specific, the CORDIC unit 212 receives an angle information z, and outputs In-phase (I) branch signal I=A*Sin(z) and Quadrature (Q) branch signal Q=A*Cos(z) signals. Note QPSK signal has fixed starting phase, that is, $$\frac{1}{4}\pi, \frac{3}{4}\pi, \frac{5}{4}\pi$$

and $$\frac{7}{4}\pi.$$

In an embodiment, suppose amplitude of the GFSK modulated signal is the same as the amplitude of the QPSK modulated signal after switch, and the phase of the GFSK modulated signal to be switched is $$\frac{1}{3}\pi,$$

then the estimated maximum phase difference is $$\frac{5}{4}\pi - \frac{1}{3}\pi = \frac{11}{12}\pi.$$

The timing unit 214 is communicatively coupled to the CORDIC unit 212 and configured to generate adaptive steps according to a switch time and the estimated maximum phase difference. Guard time, also called guard period or guard interval, is used to ensure that distinct transmissions do not interfere with one another. The purpose of the guard time is to introduce immunity to propagation delays, echoes and reflections, to which digital data is normally very sensitive. For example, in an embodiment, a guard time is 5 μs. Further, the timing unit 214 is configured to determine that the switch time is half of the guard time, that is, the switch time Δt is set to be Δt=2.5 μs. Therefore, the timing unit 214 generates adaptive steps as $$\frac{11}{12}\pi/2.5 \ \mu s = \frac{11}{30}\pi/\mu s.$$

The timing unit 214 is further configured to determine an optimal time point for switching, which ensures that the system is successfully switched and reduces switch time and meanwhile guarantees that signals are stable. Note the adaptive step can be dynamically adjusted based on the switch time and the estimated maximum phase difference.

The CORDIC unit 212 is further configured to generate an adjusted GFSK modulated signal by adjusting a phase of the GFSK modulated signal to be switched according to the estimated maximum phase difference and the adaptive steps. Such adjustment may take place during the guard time.

Figure 3:
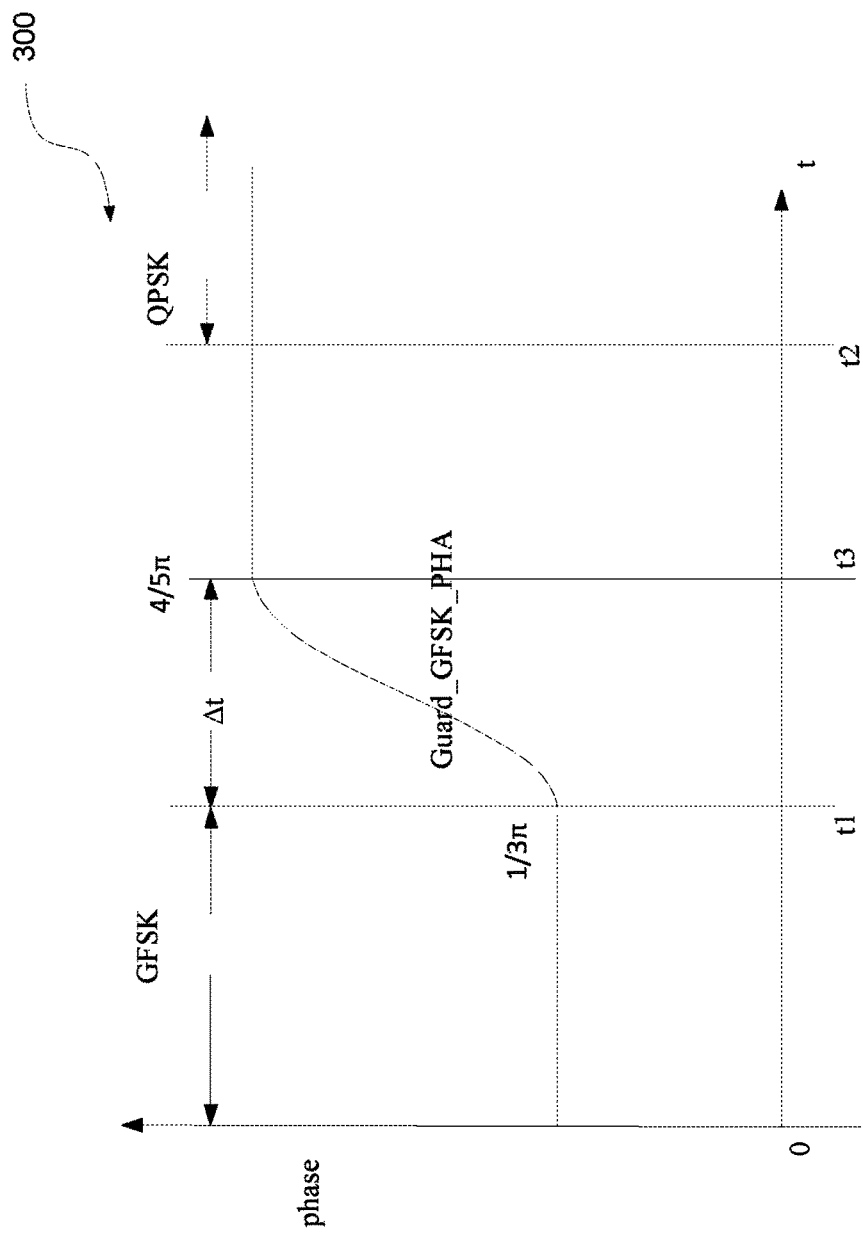
FIG. 3 is a diagram illustrating the phase of the adjusted guard signal according to an embodiment of the invention.

FIG. 3 is a diagram 300 illustrating the phase of the adjusted guard signal according to an embodiment of the invention. Referring to FIG. 3, as discussed above, the phase of the GFSK modulated signal to be switched is $$\frac{1}{3}\pi,$$

and the CORDIC unit 212 generate the adjusted GFSK modulated signal with a phase of $$\frac{5}{4}\pi.$$

In other words, the switching unit 210 has smoothly switched the baseband GFSK signal to the baseband QPSK signal by gradually and adaptively adjusting the phase of GFSK modulated signal from $$\frac{1}{3}\pi$$

to $$\frac{5}{4}\pi.$$

Note as $$\frac{5}{4}\pi$$

has the maximum phase difference from $$\frac{1}{3}\pi,$$

if the QPSK signal starts at $$\frac{3}{4}\pi$$

instead of $$\frac{5}{4}\pi,$$

the switching unit 210 can still have a smooth switch by dividing the maximum phase difference among fixed time slots Δt for switching.

The modulator 220 is communicatively coupled to the switching unit 210 and configured to generate a RF QPSK signal by mixed modulating a RF local oscillation signal with the QPSK modulated signal. Referring to FIG. 3, during time 0 to t2, to be specific, during before-switch time duration 0-t1, during-switch time duration t1-t3, and after switch time duration t3-t2, the baseband GFSK signal, the switched signal and QPSK signal are all multiplied with RF local oscillating (LO) signals. The switched signal during switch is also output. Further, there are signal output on both baseband and frequency band. Therefore smooth switch for signals is needed to avoid spur.

The power amplifier 230 is communicatively coupled to the modulator 220 and configure to generate amplified QPSK signal by amplifying the RF QPSK signal.

Figure 2B:
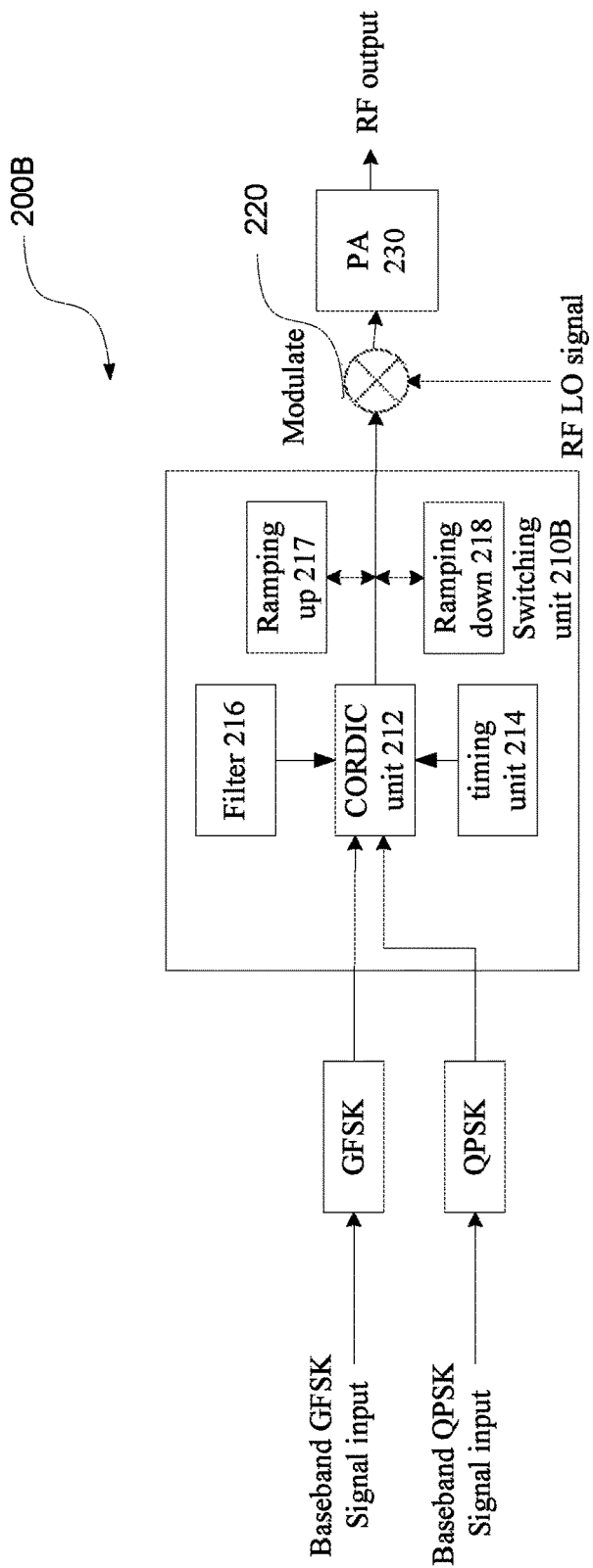
FIG. 2B is a circuit diagram illustrating a transmitter for transmitting packets according to another embodiment of the present invention.

FIG. 2B is a circuit diagram illustrating a transmitter 200B for transmitting packets according to another embodiment of the present invention. Similar to the transmitter 200A, the transmitter 200B also comprises a switching unit 210B, a modulator 220 and a power amplifier 230 as discussed above with respect to FIG. 2A. Further the switching unit in the transmitter 200B also comprises a CORDIC unit 212, a timing unit 214 and a filter 216. Alternatively or additionally, the switching unit 210B may further comprise a ramping up unit 217 and the ramping down unit 218 which are configured to use any of the window functions to perform the ramping down/up operation, for example, Hamming window, Blackman window, Triangular window or Gaussian window. For example, both ramping up unit 217 and the ramping down unit 218 are configured to use Triangular window to generate amplitude signal GUARD_QPSK_AMP_UP and GUARD_GFSK_AMP_DN as illustrated in FIG. 4A.

Figure 4A:
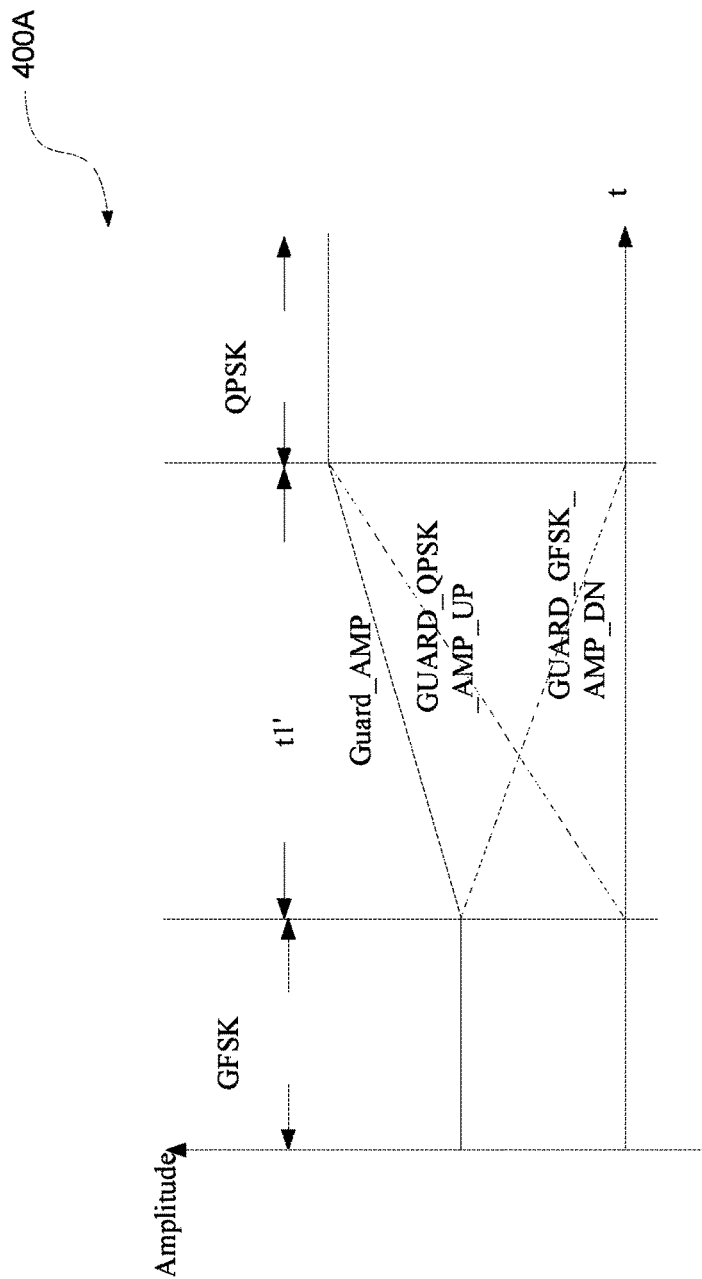
FIG. 4A is a diagram illustrating the amplitude of the adjusted guard signal according to an embodiment of the invention.

FIG. 4A is a diagram 400A illustrating the amplitude of the adjusted guard signal according to an embodiment of the invention. Further, the ascending dotted line in FIG. 4A represents amplitude signal GUARD_QPSK_AMP_UP, and the descending dotted line in FIG. 4A represents the amplitude signal GUARD_GFSK_AMP_DN. Further, the solid line in FIG. 4A represents the desired signal Guard_AMP, which is the sum of GUARD_GFSK_AMP_UP and GUARD_QPSK_AMP_DN. The duration of t1' for the guard amplitude signal Guard_AMP may be different from the Δt for the guard phase signal Guard_PHA. Alternatively, the duration of t1' may be the same as Δt for the guard phase signal Guard_PHA.

Both the ramping up unit 217 and the ramping down unit 218 change gradually. As a result, the amplitude of the end point of the GFSK signal is substantially the same as the amplitude of the starting point of the GUARD signal, and the amplitude of the end point of the GUARD signal is substantially the same as the amplitude of the starting point of the QPSK signal, for example, as shown in FIG. 4A. Further, the amplitude of the GUARD signal is also continuous. As a result, the whole range of the envelope is continuous, for example, as shown in FIG. 4A. Similarly, the phase of the GUARD signal is also continuous, as shown in FIG. 3. Therefore, spectrum leakage does not occur in the baseband, and performance of the transmitter is improved.

Alternatively, the switching unit 210 may comprise a ramping up unit 217 only, and the switching unit 210 does not comprise a ramping down unit 218. Note both phase and frequency of the signals are adjusted to ensure a smooth switch. In an embodiment, the amplitude difference between the GFSK signal and QPSK signal is fixed and preset in the system, therefore the switching unit 210 can perform the smooth switch and ensure that the amplitudes before switch and after switch are continuous.

Figure 4B:
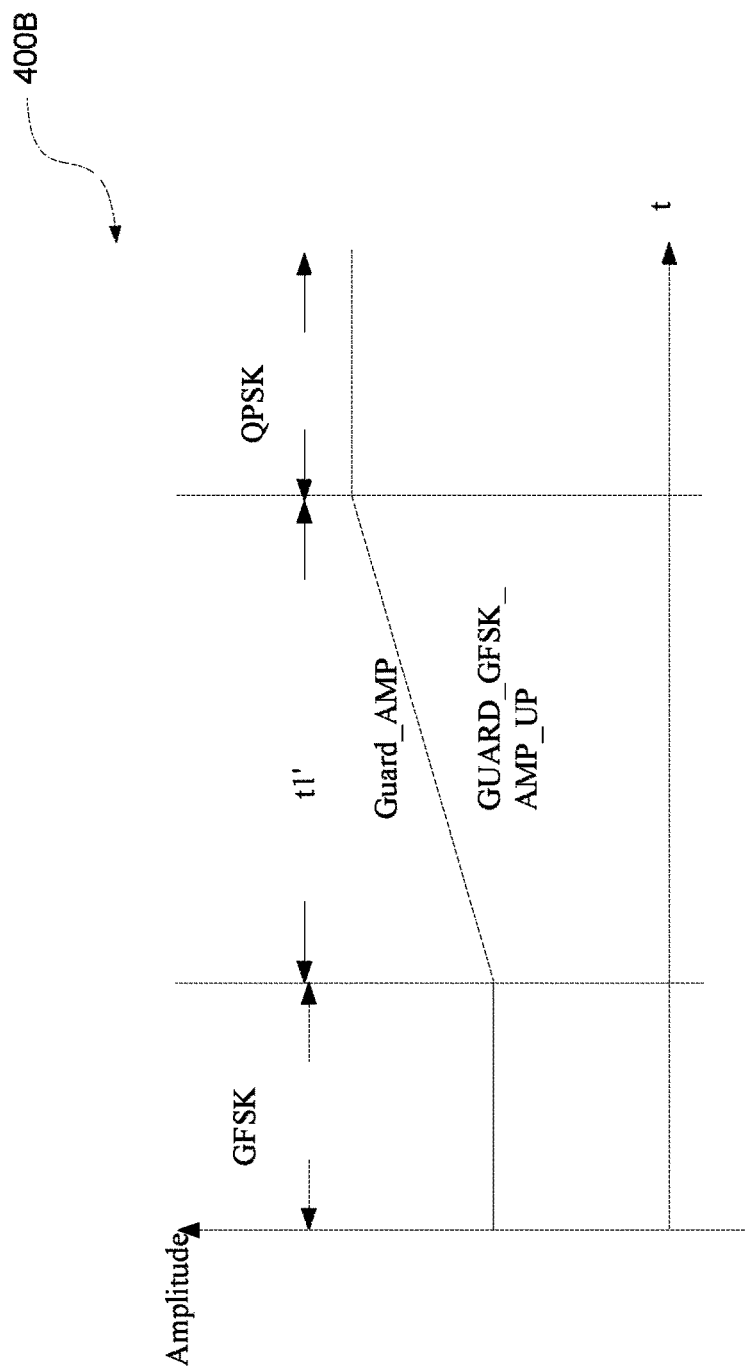
FIG. 4B is a diagram illustrating the amplitude of the adjusted guard signal according to another embodiment of the invention.

FIG. 4B is a diagram 400B illustrating the amplitude of the adjusted guard signal according to another embodiment of the invention. In an embodiment, the amplitude of the QPSK modulated signal maintains unchanged, while the ramping unit 217 ramps up the amplitude of the GFSK modulated signal gradually during the guard period to match the initial amplitude of the QPSK signal, as shown in FIG. 4B.

Alternatively, although not shown in the drawings, in an embodiment, the amplitude of the GFSK modulated signal maintains unchanged during the guard period. On the other hand, the QPSK modulated signal has a starting amplitude of that of the GFSK modulated signal before switching, and the ramping unit 217 ramps up the amplitude of the QPSK modulated signal gradually from that starting amplitude to match the amplitude of the QPSK signal after switch.

Alternatively, although not shown in the drawings, if the QPSK modulated signal has an amplitude smaller than the GFSK modulated signal, the switching unit 210 may comprise a ramping down unit 218 only without a ramping up unit 217.

Note FIG. 4A and FIG. 4B show that the GFSK modulated signal and/or the QPSK modulated signal are adjusted during the whole guard period. However, the switching time can be adjusted to be, such as half of the guard time.

Alternatively, the switching unit 210 further comprises a filter 216. The filter 216 is communicatively coupled to the CORDIC unit 212 and configured to generate a filtered maximum phase difference by filtering the estimated maximum phase difference. The estimated maximum phase difference is filtered to decompose the high frequency component of the estimated maximum phase difference into multiple adjustment steps, therefore high-frequency burst change are filtered out. Consequently, the timing unit 214 is further configured to generate the adaptive steps according to the switch time and the filtered maximum phase difference.

Figure 5:
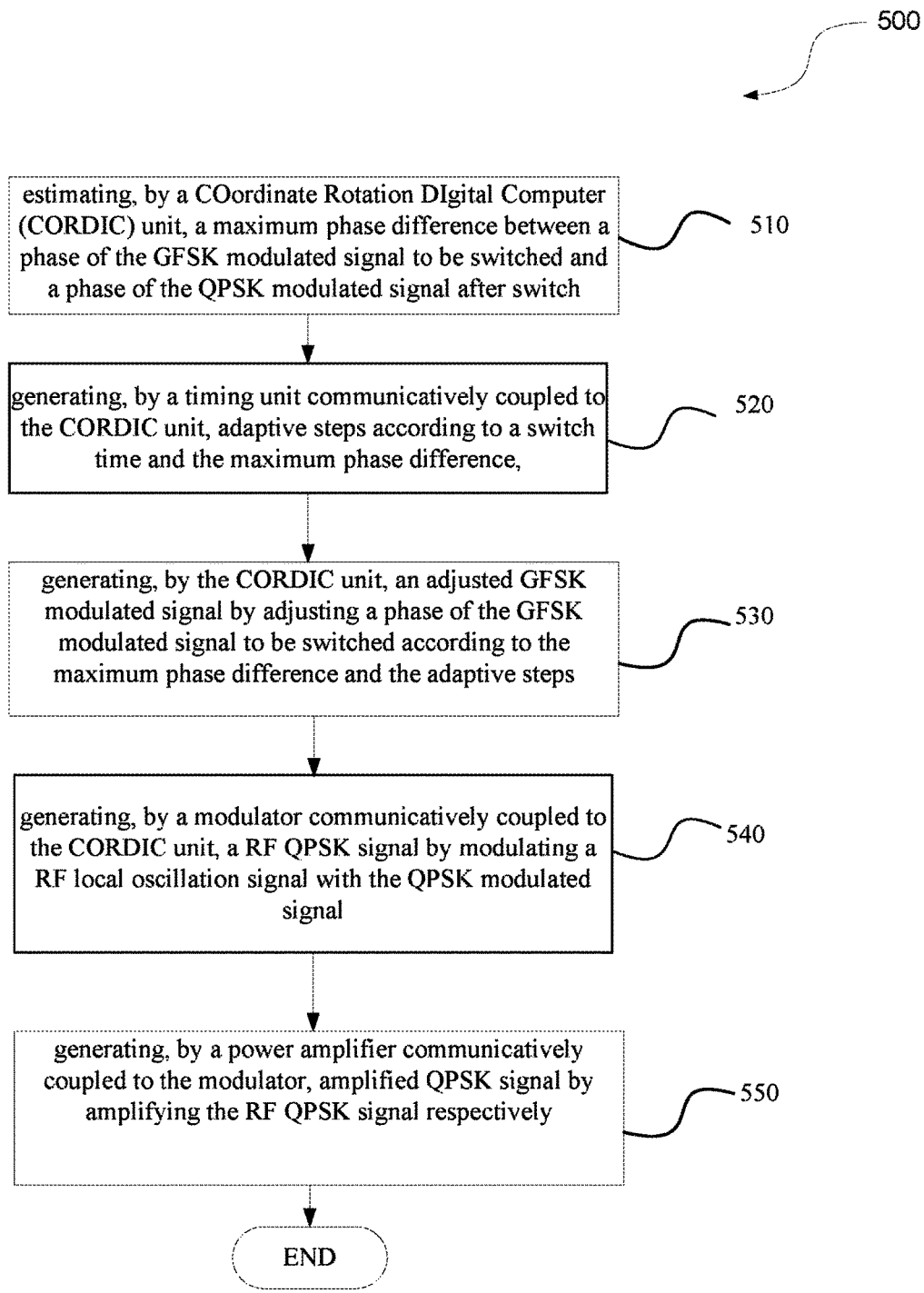
FIG. 5 is a flow chart illustrating a method of transmitting packet according to an embodiment of the invention.

FIG. 5 is a flow chart illustrating a method 500 of transmitting packet according to an embodiment of the invention.

The method 500 for transmitting packets is configured to switch from a Gaussian frequency-shift keying (GFSK) modulated signal to a Quadrature phase-shift keying (QPSK) modulated signal. The method 500 comprises estimating in block 510, by a COordinate Rotation DIgital Computer (CORDIC) unit, a maximum phase difference between a phase of the GFSK modulated signal to be switched and a phase of the QPSK modulated signal after switch; generating in block 520, by a timing unit communicatively coupled to the CORDIC unit, adaptive steps according to a switch time and the estimated maximum phase difference, and generating in block 530, by the CORDIC unit, an adjusted GFSK modulated signal by adjusting a phase of the GFSK modulated signal to be switched according to the estimated maximum phase difference and the adaptive steps; generating in block 540, by a modulator communicatively coupled to the CORDIC unit, a RF QPSK signal by respectively modulating a RF local oscillation signal with the adjusted GFSK modulated signal and by modulating the RF local oscillation signal with the QPSK modulated signal; and generating in block 550, by a power amplifier communicatively coupled to the modulator, amplified QPSK signal by amplifying the RF QPSK signal.

Alternatively, although not shown in the drawings, the method 500 further comprises generating, by a filter communicatively coupled to the CORDIC unit, a filtered maximum phase difference by filtering the estimated maximum phase difference; and generating, by the timing unit, adaptive steps according to the switch time and the filtered maximum phase difference.

Alternatively, the method 500 further comprises receiving and ramping down, by a ramping down unit, the amplitude of the GFSK modulated signal to be switched;

and receiving and ramping up, by a ramping up unit, the amplitude of the QPSK modulated signal after switch.

Alternatively, a guard time is 5 µs, and the method further comprises determining, by the timing unit, the switch time according to the guard time.

From the foregoing, it will be appreciated that specific embodiments of the technology have been described herein for purposes of illustration, however various modifications can be made without deviating from the spirit and scope of the present invention. Accordingly, the present invention is not restricted except in the spirit of the appended claims.

Other variations to the disclosed embodiments can be understood and effected by those skilled in the art in practicing the claimed invention, from a study of the drawings, the disclosure, and the appended claims. In the claims the word "comprising" does not exclude other elements or steps, and the indefinite article "a" or "an" does not exclude a plurality. Even if particular features are recited in different dependent claims, the present invention also relates to the embodiments including all these features. Any reference signs in the claims should not be construed as limiting the scope.

Features and aspects of various embodiments may be integrated into other embodiments, and embodiments illustrated in this document may be implemented without all of the features or aspects illustrated or described. One skilled in the art will appreciate that although specific examples and embodiments of the system and methods have been described for purposes of illustration, various modifications can be made without deviating from the spirit and scope of the present invention. Moreover, features of one embodiment may be incorporated into other embodiments, even where those features are not described together in a single embodiment within the present document. Accordingly, the invention is described by the appended claims.

What is claimed is:

1. A transmitter for transmitting packets, wherein the transmitter is configured to switch from a Gaussian frequency-shift keying (GFSK) modulated signal to a Quadrature phase-shift keying (QPSK) modulated signal, the transmitter comprising:
    a switching unit comprising
        a COordinate Rotation DIgital Computer (CORDIC) unit configured to estimate a maximum phase difference between a phase of the GFSK modulated signal to be switched and a phase of the QPSK modulated signal after switch;
        a timing unit communicatively coupled to the CORDIC unit and configured to generate adaptive steps according to a switch time and the estimated maximum phase difference, wherein
        the CORDIC unit is further configured to generate an adjusted GFSK modulated signal by adjusting a phase of the GFSK modulated signal to be switched according to the estimated maximum phase difference and the adaptive steps;
    a modulator communicatively coupled to the switching unit and configured to generate a RF QPSK signal by mixing modulating the RF local oscillation signal with the QPSK modulated signal; and
    a power amplifier communicatively coupled to the modulator and configure to generate amplified QPSK signal by amplifying the RF QPSK signal respectively.

2. The transmitter of claim 1, wherein the switching unit further comprises:
    a filter communicatively coupled to the CORDIC unit and configured to generate a filtered maximum phase difference by filtering the estimated maximum phase difference; and
    the timing unit is further configured to generate the adaptive steps according to the switch time and the filtered maximum phase difference.

3. The transmitter of claim 1, wherein the switching unit further comprises:
    a ramping down unit configured to receive and ramp down the amplitude of the GFSK modulated signal to be switched; and
    a ramping up unit configured to receive and ramp up the amplitude of the QPSK modulated signal after switch.

4. The transmitter of claim 1, wherein a guard time is 5 µs, and the timing unit is further configured to determine the switch time according to the guard time.

5. A method for transmitting packets, wherein the transmitter is configured to switch from a Gaussian frequency-shift keying (GFSK) modulated signal to a Quadrature phase-shift keying (QPSK) modulated signal, the method comprising:
    estimating, by a COordinate Rotation DIgital Computer (CORDIC) unit, a maximum phase difference between a phase of the GFSK modulated signal to be switched and a phase of the QPSK modulated signal after switch;
    generating, by a timing unit communicatively coupled to the CORDIC unit, adaptive steps according to a switch time and the estimated maximum phase difference,
    generating, by the CORDIC unit, an adjusted GFSK modulated signal by adjusting a phase of the GFSK modulated signal to be switched according to the estimated maximum phase difference and the adaptive steps;
    generating, by a modulator communicatively coupled to the CORDIC unit, a RF QPSK signal by modulating a RF local oscillation signal with the QPSK modulated signal; and
    generating, by a power amplifier communicatively coupled to the modulator, amplified QPSK signal by amplifying the RF QPSK signal respectively.

6. The method of claim 5, further comprising:
    generating, by a filter communicatively coupled to the CORDIC unit, a filtered maximum phase difference by filtering the estimated maximum phase difference; and
    generating, by the timing unit, adaptive steps according to the switch time and the filtered maximum phase difference.

7. The method of claim 5, further comprising:

receiving and ramping down, by a ramping down unit, the amplitude of the GFSK modulated signal to be switched; and receiving and ramping up, by a ramping up unit, the amplitude of the QPSK modulated signal after switch.

8. The method of claim 5, wherein a guard time is 5 µs, and the method further comprises determining, by the timing unit, the switch time according to the guard time.

* * * * *